F. SIMONS.
UNIVERSAL COUPLING.
APPLICATION FILED MAY 31, 1912.

1,140,720.

Patented May 25, 1915.

Witnesses
W. C. Stein
M. G. Lindsay

Inventor
Frank Simons.
by Alfred O'Cicks Atty.

UNITED STATES PATENT OFFICE.

FRANK SIMONS, OF ST. LOUIS, MISSOURI.

UNIVERSAL COUPLING.

1,140,720.　　　　Specification of Letters Patent.　　Patented May 25, 1915.

Application filed May 31, 1912.　Serial No. 700,877.

*To all whom it may concern:*

Be it known that I, FRANK SIMONS, a citizen of the United States, and resident of St. Louis, Missouri, have invented certain new and useful Improvements in Universal Couplings, of which the following is a specification.

This invention relates to improvements in universal couplings used for liquid or elastic fluids and has for its object a two-part structure arranged to be adjusted at any angle so as to be brought in proper alinement with the pipes without causing bends, and eliminating the use of elbows and the like.

A further object is to construct a universal coupling, the parts formed in the shape of a cup, each having a hollow stem through which the liquid or elastic air is admitted and discharged, the cups properly united and so arranged as to be freely adjusted to accommodate various angles and a suitable bushing between the uniting edges to prevent leakage as well as corrosion.

A further object is to provide a coupling having a strainer through which the liquid or elastic fluid must pass from the inlet to the outlet to act as a preventative from foreign substance when entering the discharge pipe.

Figure 1:
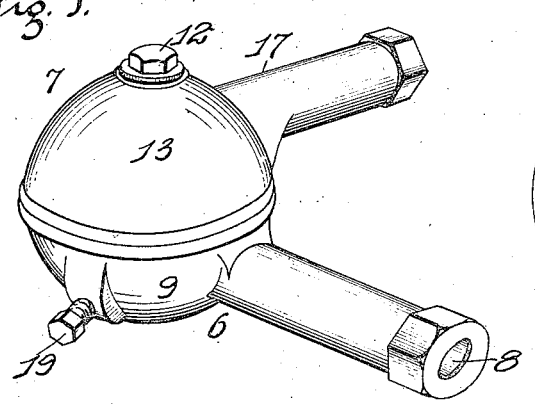
Figure 2:
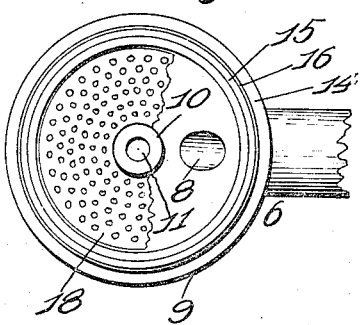
Figure 3:
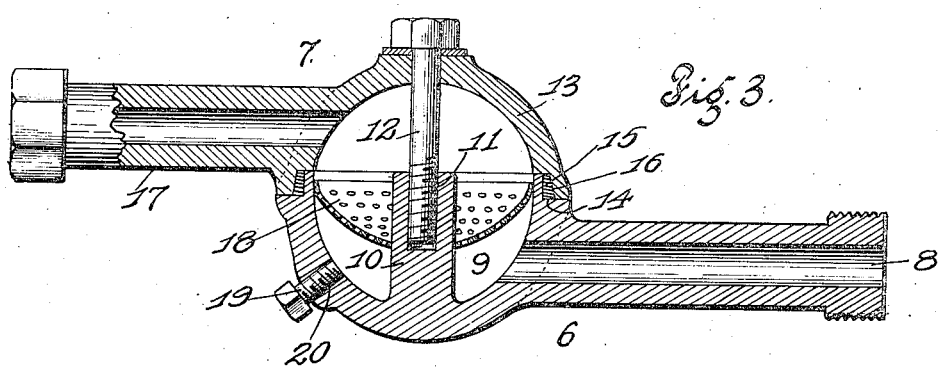

Figure 1 is a perspective view of my invention. Fig. 2 is a top plan view of one section of the coupling. Fig. 3 is a vertical central, sectional view.

In carrying out my invention I provide a coupling constructed preferably of two sections 6 and 7, the section 6 acting as a stationary section, or the one attached to the rigid connection leading from the source of supply and through which the liquid or elastic fluid is admitted through the passage-way 8 and into the cup 9. In the cup 9 is formed a central projection 10 provided with an internally screw-threaded bore 11. In this bore is inserted a cap-screw or like device 12 by which the cup 13 of the section 7 is attached.

The contacting surface of the cup 9 is cut away forming a recess 14 and in this recess is firmly located a bushing 15 of non-corrodible material, its outer edge being beveled or inclined as indicated by the numeral 16; the contact surface of the cup 13 is likewise recessed and arranged to snugly fit over the bushing 15 making an absolute leak-proof joint. The construction of this is clearly shown in Fig. 3 and by means of the cap-screw 12 which is also of a non-corrodible material, the two sections are held together, the upper section being permitted to be adjusted so that its stem 17 can be brought in proper alinement with the piping to which it is connected without the use of elbows or other pipe fittings. In the cup portion 7 of the lower section I place a strainer 18 which may be of a perforated material or a disk of reticulated material. By the use of this strainer any foreign substance which might enter into the cup through the inlet passage is held in the cup and prevented from passing through the discharge end, and in the event the space below the strainer should become clogged with sediment the same can be readily removed by removing the screw 19 and inserting an instrument, extracting such sediment through the opening 20 occupied by the screw.

The coupling is of a convenient structure and can be moved to suit the position and location of a communicating section; it provides a direct discharge and a unique finished appearance.

Having fully described my invention what I claim is:

A universal coupling comprising a cup-shaped inlet member, a cup-shaped outlet member, the contacting surfaces of each having a portion of its material cut away forming projecting flanges, a bushing located between the cups, a central internally screw-threaded projection formed integral and within one of the cup-shaped members and extending to the center of the coupling, a cap-screw extending through the other cup-shaped member and seated in the internally screw-threaded projection, in combination with a cup-shaped strainer located in one of the cup-shaped members and around the screw threaded projection substantially as specified.

In testimony whereof, I have signed my name to this specification, in presence of two subscribing witnesses.

FRANK SIMONS.

Witnesses:
　ALFRED A. EICKS,
　WALTER C. STEIN.